June 23, 1959 — J. J. KACIAN — 2,891,332
COMBINATION SCOOP AND WHEELED CART
Filed Jan. 22, 1957
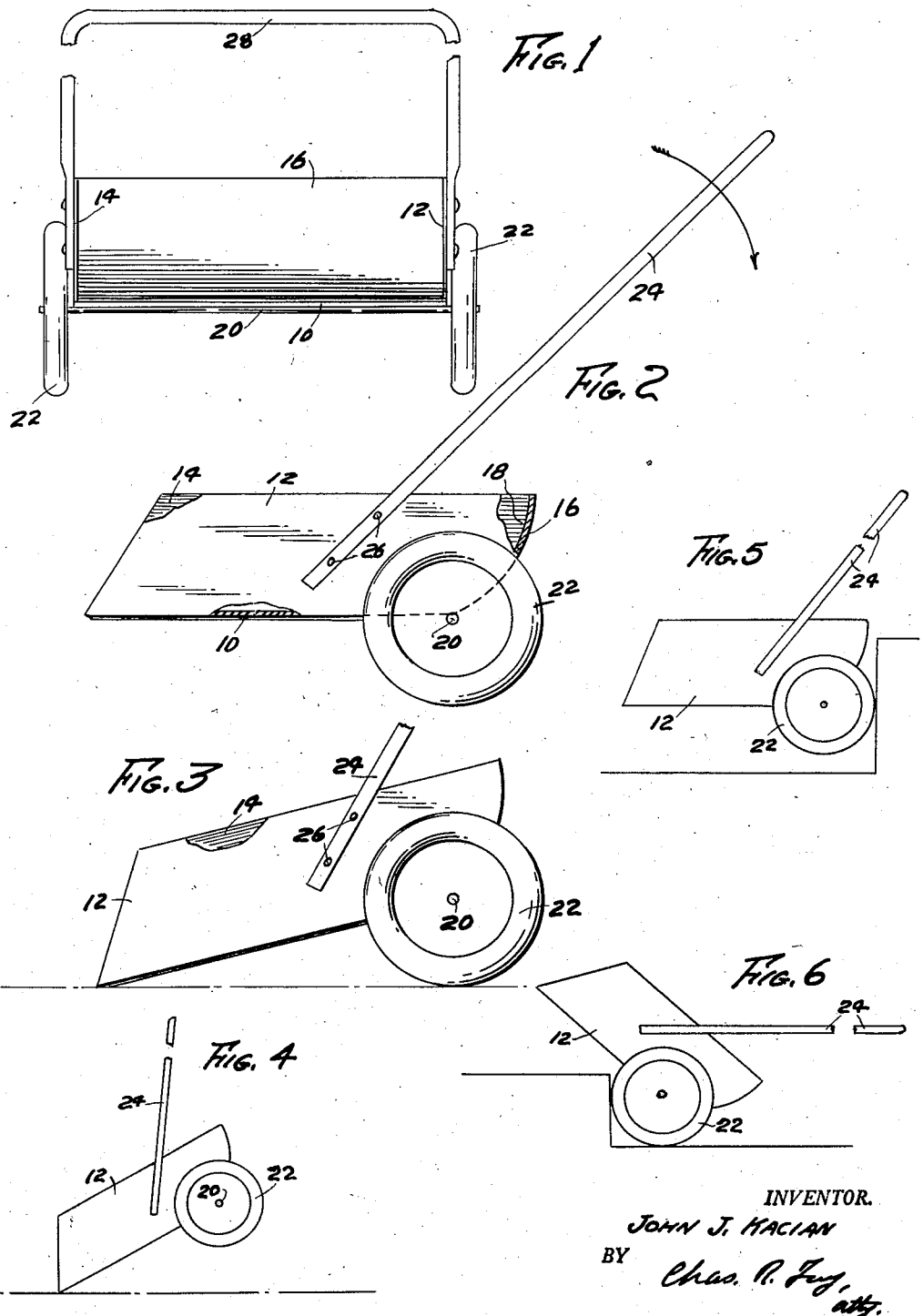
INVENTOR.
JOHN J. KACIAN
BY Chas. R. Fay,
atty.

United States Patent Office 2,891,332
Patented June 23, 1959

2,891,332

COMBINATION SCOOP AND WHEELED CART

John J. Kacian, Gardner, Mass.

Application January 22, 1957, Serial No. 635,423

1 Claim. (Cl. 37—130)

This invention relates to a new and improved wheeled scoop and cart which is very easy to fill and empty and in which to transport relatively heavy loads from one spot to another, said scoop being used advantageously as a snow-removal device both for scooping the snow from an area to be cleaned and transporting the scoop full of snow to a remote location, where it is easily dumped out.

Other objects of the invention include the provision of a scoop body having a flat bottom and attached side walls, an open top and front, and a closed rear wall on the arc of a circle, combined with a pair of wheels which are attached at the under side of the body adjacent the rear wall at the point where it joins the flat bottom, said wheels being of a diameter to extend rearwardly beyond the rear wall to a slight extent in a direction parallel to the flat bottom of the scoop; and including a pusher handle secured to the side walls of the scoop well forwardly of the wheels, whereby the device is easily rolled up and down stairs, curbstones, etc. and is very easily tilted so that the bottom of the scoop lies at an angle to the ground when it is used for scooping purposes or for loading, and is easily pivoted into horizontal position for transportation, said handle being positioned so as to easily tilt the cart forwardly, removing the wheels from the ground surface in order to dump the contents of the cart out through the open forward end thereof.

Other objects and advantages of the invention will appear hereinafter.

Reference is to be had to the accompanying drawings, in which

Fig. 1 is a view in front elevation of the device, parts being broken away;

Fig. 2 is a view in side elevation illustrating the scoop in horizontal position;

Fig. 3 is a view similar to Fig. 2 showing the scoop at rest on its forward edge and the wheels;

Fig. 4 is another view similar to Fig. 2 with part in section and illustrating the dumping action;

Fig. 5 is a diagrammatic view illustrating the manner in which the cart is easily moved up and down steps; and Fig. 6 is a diagrammatic view illustrating how the cart is easily moved up a step in a forward direction.

The present device comprises a body which is preferably made of sheet metal and has a solid bottom 10 which is flat and side walls 12 and 14 joined at the rear by a rear wall 16 forming a closed end of the scoop, the top and front thereof being open.

The rear wall 16 is made on the arc of a circle so as to provide a smooth curve at 18 in the interior thereof and at the junction of this curved arc and the flat bottom portion 10 there is provided a cross shaft 20 which may be secured to the bottom of the device in any desired way as by welding or strapping. This shaft 20 mounts a pair of relatively large wheels 22 exteriorly of the side walls 12 and 14.

An elongated U-shaped pusher handle 24 is secured to the side walls 14 by any desired means such as rivets 26 and as seen in Fig. 2, this handle extends on an incline to the rear so that the cross bar 28 thereof when pushed downwardly in the direction of the arrow in Fig. 2 obtains a mechanical advantage, and the cart is very easily pivoted in a clockwise direction about the axle of the wheels as an axis. Thus it is seen that the cart is very easily pivoted from the Fig. 3 position to the Fig. 2 position and Fig. 6 position, regardless of the weight of the contents in the cart.

The wheels 22 are preferably of a size and have their axles so positioned that the periphery thereof extends rearwardly beyond the rear 16 in a direction parallel to the flat bottom 10 as is clearly illustrated in Figs. 2 and 5. This allows for the cart to be easily moved up and down stairs, going forwardly down the stairs and rearwardly up the stairs as clearly diagrammatically shown in Fig. 5. Also, however, the cart may be pushed forwardly up a curbstone as shown in Fig. 6 merely by tilting the handle downwardly as in Fig. 2 to the position of Fig. 6, whereupon the cart is easily pushed up the single step of the curbstone.

With the device positioned at rest in Fig. 3, it will be seen that it is very easy to fill it with loose material or with logs, luggage, groceries or any other material which is desired to be transported. By then pushing down slightly on the handle 24, the Fig. 2 position is achieved and a good balance about the axle 20 is provided so that the cart is either pushed or pulled very easily and over rough ground if necessary. When a position of deposit is reached, it is merely necessary to allow the cart to return to its position as shown in Fig. 3 and then to push upon the handle in a counter-clockwise direction, tilting the cart up in the Fig. 4 position and letting the contents slide out.

The present cart may be used for many different purposes although it is particularly adapted for general snow removal as for large areas, driveways, etc. as well as the usual sidewalk. The way in which the snow is removed has been described above but of course it is also clear that with the device in the Fig. 3 position, it may be pushed forwardly to scoop up the snow, and by arranging the cart with its forward edge at any elevation, as for instance in Fig. 2, or at some point between the positions of Figs. 2 and 3, the snow may be scooped off at any desired level.

However, the device is also usable to great advantage as a rubbish or barrel carrier, as a gardening cart, log carrier, wheelbarrow, for general clean-up purposes, as a shopping cart, as a beach cart, for transporting loam or mixed cement, for leaf removal, for manure spreading and as a compostpile tender, for ice-fishing, hunting and even as a golf cart if desired. Many other uses are possible for a cart of the class described which is simple in construction, easily operated, and very effective for transporting any kind of material from one point to another, and also a closure member for the open front end of the device may be easily applied for use for transporting loose materials particularly produce in the nature of fruit and vegetables or for when using the device as a shopping cart.

Having thus described my invention and the advantages thereof, I do not wish to be limited to the details herein disclosed, otherwise than as set forth in the claim, but what I claim is:

A combined scoop and cart comprising a body including a flat bottom, side walls projecting upwardly therefrom, and an arc-shaped rear wall extending on a curve upwardly and to the rear and conjoining the side walls, the front and top of the body being open, an axle mounted on the bottom forwardly of the rear wall and adjacent the junction of the rear wall and the bottom, a pair of wheels on the axle, said wheels extending down below the bottom so that the body rests on the wheels and the bottom at the front edge thereof, and a handle secured to the side walls forwardly of the wheels, said handle extending upwardly and to the rear above the wheels, the periphery of said wheels projecting only slightly to the rear of the rearmost portion of said rear wall when the flat bottom is horizontal with all the weight of the cart on the wheels in position to travel the cart.

References Cited in the file of this patent

UNITED STATES PATENTS

| | | |
|---|---|---|
| 861,308 | McMann | July 30, 1907 |
| 1,015,969 | McCrary | Jan. 30, 1912 |
| 1,200,196 | Huberty | Oct. 3, 1916 |
| 1,285,046 | Clemetson | Nov. 19, 1918 |